US009085672B2

(12) United States Patent
Matsubara et al.

(10) Patent No.: US 9,085,672 B2
(45) Date of Patent: Jul. 21, 2015

(54) LIQUID CRYSTALLINE POLYESTER COMPOSITION AND METAL COMPOSITE MOLDED PRODUCT USING THE SAME

(75) Inventors: Satoshi Matsubara, Nagoya (JP); Hideyuki Umetsu, Nagoya (JP); Takayuki Hase, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/009,535

(22) PCT Filed: Dec. 14, 2011

(86) PCT No.: PCT/JP2011/006991
§ 371 (c)(1),
(2), (4) Date: Oct. 3, 2013

(87) PCT Pub. No.: WO2012/137271
PCT Pub. Date: Oct. 11, 2012

(65) Prior Publication Data
US 2014/0022502 A1 Jan. 23, 2014

(30) Foreign Application Priority Data

Apr. 6, 2011 (JP) ................................. 2011-084333

(51) Int. Cl.
C08K 3/34 (2006.01)
C08K 7/14 (2006.01)
C09K 19/38 (2006.01)

(52) U.S. Cl.
CPC . *C08K 3/34* (2013.01); *C08K 3/346* (2013.01); *C08K 7/14* (2013.01); *C09K 19/3809* (2013.01)

(58) Field of Classification Search
CPC ............ C08K 3/34; C08K 3/346; C08K 7/14; C09K 19/3809
USPC .................. 252/299.01, 299.6; 349/182, 183; 524/449; 428/1.1
See application file for complete search history.

(56) References Cited

U.S. PATENT DOCUMENTS

| 6,797,198 B1 | 9/2004 | Miyashita et al. |
| 2003/0078333 A1 | 4/2003 | Kawaguchi et al. |

FOREIGN PATENT DOCUMENTS

| JP | 4-202558 A | 7/1992 |
| JP | 3111471 B | 9/2000 |
| JP | 2001-089581 A | 4/2001 |
| JP | 2001-106923 A | 4/2001 |
| JP | 2003-321598 | 11/2003 |
| JP | 2003-321598 A | 11/2003 |
| JP | 2005-146124 A | 6/2005 |
| JP | 4161611 B | 8/2008 |
| JP | 4450902 B | 2/2010 |
| JP | 2012-072370 A | 4/2012 |
| WO | 01/40380 A1 | 6/2001 |

*Primary Examiner* — Geraldina Visconti
(74) *Attorney, Agent, or Firm* — DLA Piper LLP (US)

(57) ABSTRACT

A liquid crystalline polyester composition contains 100 parts by weight of a liquid crystalline polyester (A) and 10 to 100 parts by weight of a mica (B), wherein a rate in number of mica with a ratio (d1/d2) of a long diameter (d1) to a short diameter (d2) that is greater than 2.0, to an entire content of the mica (B) contained in the liquid crystalline polyester composition is not higher than 20%.

11 Claims, 2 Drawing Sheets

LIQUID CRYSTALLINE POLYESTER COMPOSITION AND METAL COMPOSITE MOLDED PRODUCT USING THE SAME

TECHNICAL FIELD

This disclosure relates to a liquid crystalline polyester composition and a metal composite molded product using the same.

BACKGROUND

In recent years, with increased demand for high-performance plastics, lots of polymers of various novel properties have been developed and come on the market. Among them, liquid crystalline resins having characteristic parallel arrangement of molecular chains and showing optical anisotropy, such as liquid crystalline polyester, have received particular attention, because of their excellent moldability and mechanical properties, and their applications have been expanded to mechanical components and electric and electronic components. In particular, such liquid crystalline resins are favorably used for electric and electronic components requiring the high flowability, such as connectors.

Accompanied with recent downsizing and weight reduction of equipment, there has been increasing demand for mechanical components and electric and electronic components having the thin wall thickness and the more complicated shape. Molded products produced by using the liquid crystalline resin compositions are often used in the form of composite molded products with metals. The resin has the greater coefficient of linear expansion than the metal. In the metal composite molded product, this difference in coefficient of linear expansion may cause the resin part to continuously receive a stress and may thereby lead to a possibility that the resin part is damaged. Additionally, a thin-walled composite molded product has a problem that a dielectric breakdown occurs under application of a high voltage and may cause an insulation failure, due to the extreme thinness of the resin part that is responsible for the insulation property.

As a means to decrease the coefficient of linear expansion, a resin composition has been proposed (see, for example, WO 01/40380), which has a synthetic resin with the melt temperature of not lower than 300° C. mixed with a plate-like inorganic filler having a water dispersible pH of 5.5 to 8.0, the amount of eluted alkali of not greater than 30 ppm for Na and not greater than 40 ppm for K, the maximum diameter of not greater than 50 µm, the thickness of not greater than 1.0 µm and the aspect ratio of not less than 20.

As one means to control the amount of deformation of a molded product during heat treatment, a liquid crystalline polymer composition has been proposed (see, for example, JP 4450902 B), which has 100 parts by weight of a liquid crystalline polymer mixed with 5 to 100 parts by weight of a plate-like filler having a ratio (D/W) of not greater than 5, wherein D/W is the ratio of a maximum particle diameter (D) of the plate-like filler to a particle diameter (W) in a direction (y direction) perpendicular to an x direction which is along the direction of the maximum particle diameter, and a rate of W to a particle thickness (H) in a range of 3 to 200.

As another means to control the amount of deformation of a molded product during heat treatment, a liquid crystalline polyester composition has been proposed (see, for example, JP 3111471 B), which has 100 parts by weight of a liquid crystalline polyester mixed with 1 to 200 parts by weight of a mica having a bulk specific gravity of 0.18 to 0.23 and an average particle diameter of 10 to 15 µm.

As yet another means to control the amount of deformation of a molded product during heat treatment, a liquid crystalline resin composition has been proposed (see, for example, JP 4161611 B), which has 100 parts by weight of one or more liquid crystalline resins, which are selected out of liquid crystalline polyesters and liquid crystalline polyester amides, mixed with 5 to 100 parts by weight of a scale-like filler (i) having a number-average particle diameter of 10 to 48 µm, 5 to 100 parts by weight of a fibrous filler (ii) having a number-average fiber length of 10 to 60 µm and lithium stearate or barium stearate (iii). A molded product produced from any of such resin compositions has an improvement in the amount of deformation during heat treatment, but still has problems that the molded product has insufficient resistance to the continuously applied stress, which may cause breakdown at a joint with a metal, and has insufficient dielectric breakdown strength.

Recent size reduction and refinement of molded products requires satisfaction of both the high degrees of creep property and dielectric breakdown strength. The proposed techniques, however, still do not sufficiently satisfy all these requirements. Therefore, it could be helpful to provide a liquid crystalline polyester composition capable of producing a molded product having high creep property and high dielectric breakdown strength.

SUMMARY

We thus provide:

(1) A liquid crystalline polyester composition contains 100 parts by weight of a liquid crystalline polyester (A) and 10 to 100 parts by weight of a mica (B). In this liquid crystalline polyester composition, a rate in number of mica with a ratio ($d_1/d_2$) of a long diameter ($d_1$) to a short diameter ($d_2$) that is greater than 2.0, to an entire content of the mica (B) contained in the liquid crystalline polyester composition is not higher than 20%.

(2) A volume-average particle diameter of the mica (B) contained in this liquid crystalline polyester composition is 5 µm to 50 µm. In this liquid crystalline polyester composition, a ratio ($D50/D10$) of a 50% cumulative frequency particle diameter ($D50$) to a 10% cumulative frequency particle diameter ($D10$) in a cumulative volume size distribution curve is 2.00 to 3.00.

In the liquid crystalline polyester composition described in (1), however, the volume-average particle diameter of the mica (B) may be less than 5 µm. In the liquid crystalline polyester composition described in (1), the volume-average particle diameter of the mica (B) may alternatively be greater than 50 µm.

In the liquid crystalline polyester composition described in (1), the ratio ($D50/D10$) may be less than 2.00. In the liquid crystalline polyester composition described in (1), the ratio ($D50/D10$) may alternatively be greater than 3.00.

(3) In the liquid crystalline polyester composition described in either (1) or (2), a weight-average thickness of the mica (B) contained in this liquid crystalline polyester composition is 0.10 µm to 1.0 µm. A weight fraction of mica having a thickness of not less than 1.0 µm is 1.0 to 30.0%.

In the liquid crystalline polyester composition described in either (1) or (2), however, the weight-average thickness of the mica (B) may be less than 0.10 µm. In the liquid crystalline polyester composition described in either (1) or (2), the weight-average thickness of the mica (B) may alternatively be greater than 1.0 µm.

In the liquid crystalline polyester composition described in either (1) or (2), the weight fraction of the mica having the thickness of not less than 1.0 µm may be less than 1.0%. In the liquid crystalline polyester composition described in either (1) or (2), the weight fraction of the mica having the thickness of not less than 1.0 µm may alternatively be greater than 30.0%.

(4) The liquid crystalline polyester composition described in any of (1) to (3) further contains 10 to 100 parts by weight of an inorganic fibrous filler (C) having a number-average fiber length of 30 to 500 µm.

In the liquid crystalline polyester composition described in any of (1) to (3), however, the content of the inorganic fibrous filler (C) having the number-average fiber length of 30 to 500 µm may, however, be less than 10 parts by weight. In the liquid crystalline polyester composition described in any of (1) to (3), the content of the inorganic fibrous filler (C) having the number-average fiber length of 30 to 500 µm may alternatively be greater than 100 parts by weight.

(5) The liquid crystalline polyester composition described in any of (1) to (4), wherein the liquid crystalline polyester (A) has structural units (I), (II), (III), (IV) and (V) shown below. In this liquid crystalline polyester composition, a content of the structural unit (I) is 65 to 80 mol % relative to a total amount of the structural units (I), (II) and (III). A content of the structural unit (II) is 55 to 85 mol % relative to a total amount of the structural units (II) and (III). A content of the structural unit (IV) is 50 to 95 mol % relative to a total amount of the structural units (IV) and (V)

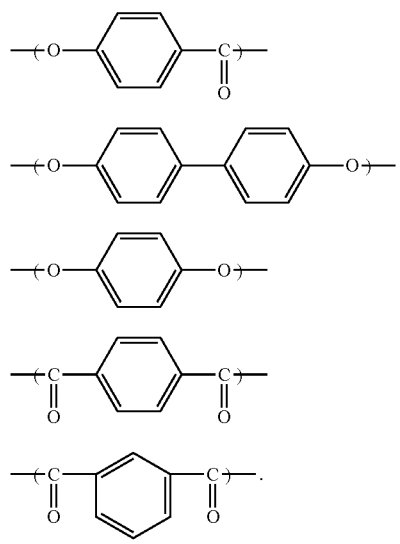

In the liquid crystalline polyester composition described in any of (1) to (4), however, the content of the structural unit (I) may be less than 65 mol % relative to the total amount of the structural units (I), (II) and (III). The content of the structural unit (I) may alternatively be greater than 80 mol % relative to the total amount of the structural units (I), (II) and (III).

In the liquid crystalline polyester composition described in any of (1) to (4), the content of the structural unit (II) may be less than 55 mol % relative to the total amount of the structural units (II) and (III). The content of the structural unit (II) may alternatively be greater than 85 mol % relative to the total amount of the structural units (II) and (III).

In the liquid crystalline polyester composition described in any of (1) to (4), the content of the structural unit (IV) may be less than 50 mol % relative to the total amount of the structural units (IV) and (V). The content of the structural unit (IV) may alternatively be greater than 95 mol % relative to the total amount of the structural units (IV) and (V).

The liquid crystalline polyester contained in the liquid crystalline polyester composition described in any of (1) to (4) may not have at least part of the structural units (I), (II), (III), (IV) and (V).

(6) We provide a manufacturing method of the liquid crystalline polyester composition described in any of (1) to (5). This manufacturing method of the liquid crystalline polyester composition melt-kneads at least the liquid crystalline polyester (A) and the mica (B) supplied to a twin-screw extruder. This manufacturing method of the liquid crystalline polyester composition employs a screw arrangement that has at least one built-in kneading disk and is set to achieve a circumferential velocity of 0.65 m/s to 1.30 m/s.

In the manufacturing method of the liquid crystalline polyester composition described in any of (1) to (5), however, the circumferential velocity may be lower than 0.65 m/s. In the manufacturing method of the liquid crystalline polyester composition described in any of (1) to (5), the circumferential velocity may alternatively be higher than 1.30 m/s.

The liquid crystalline polyester composition described in any of (1) to (5) may be manufactured by a different method from the method of melt-kneading the liquid crystalline polyester (A) and the mica (B) supplied to the twin-screw extruder.

(7) We provide a molded product manufactured by injection molding the liquid crystalline polyester composition described in any of (1) to (5).

The molded product may, however, be manufactured by another technique different from injection molding by using the liquid crystalline polyester composition described in any of (1) to (5).

(8) We provide the molded product described in (7) that is a metal composite molded product having a resin part and a metal part joined to the resin part.

The molded product described in (7) may, however, be a molded product that is different from the metal composite molded product having the resin part and the metal part joined to the resin part.

The liquid crystalline polyester composition is capable of producing a molded product having high creep property and high dielectric breakdown strength. The liquid crystalline polyester composition is favorably used for thin-wall electric and electronic components and machine components in complicated shapes and is especially useful for metal composite molded products.

DESCRIPTION OF SYMBOLS

Figure 1:
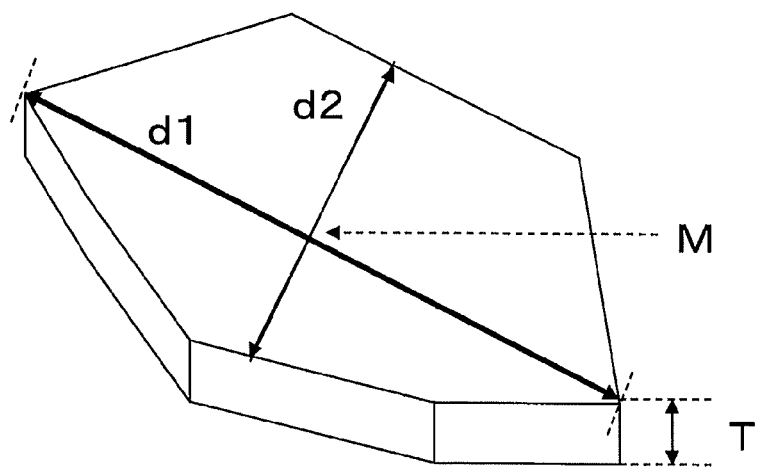
FIG. 1 is a conceptual view showing a long diameter (d1) and a short diameter (d2) of mica.

D1 Long diameter
D2 Short diameter
M Center of long diameter line
T Thickness

DETAILED DESCRIPTION

The liquid crystalline polyester composition contains 10 to 100 parts by weight of a mica with the ratio of a long diameter to a short diameter in a specific range relative to 100 parts by weight of a liquid crystalline polyester.

The liquid crystalline polyester has structural units selected from the group including, for example, aromatic oxycarbonyl unit, aromatic and/or aliphatic dioxy units, and aromatic and/or aliphatic dicarbonyl units and forms an anisotropic molten phase.

The aromatic oxycarbonyl unit may be structural unit derived from, for example, p-hydroxybenzoic acid or 6-hydroxy-2-naphthoic acid, and p-hydroxybenzoic acid is preferable. The aromatic and/or aliphatic dioxy unit may be structural unit derived from, for example, 4,4'-dihydroxybiphenyl, hydroquinone, 3,3',5,5'-tetramethyl-4,4'-dihydroxybiphenyl, t-butyl hydroquinone, phenyl hydroquinone, 2,6-dihydroxynaphthalene, 2,7-dihydroxynaphthalene, 2,2-bis(4-hydroxyphenyl)propane, 4,4'-dihydroxydiphenyl ether, ethylene glycol, 1,3-propylene glycol or 1,4-butanediol, and 4,4'-dihydroxybiphenyl and hydroquinone are preferable. The aromatic and/or aliphatic dicarbonyl unit may be structural unit derived from, for example, terephthalic acid, isophthalic acid, 2,6-naphthalenedicarboxylic acid, 4,4'-diphenyldicarboxylic acid, 1,2-bis(phenoxy)ethane-4,4'-dicarboxylic acid, 1,2-bis(2-chlorophenoxy)ethane-4,4'-dicarboxylic acid, 4,4'-diphenyl ether dicarboxylic acid, adipic acid or sebacic acid, and terephthalic acid and isophthalic acid are preferable.

Concrete examples of the liquid crystalline polyester include: liquid crystalline polyester having structural unit derived from p-hydroxybenzoic acid and 6-hydroxy-2-naphthoic acid; liquid crystalline polyester having structural unit derived from p-hydroxybenzoic acid, structural unit derived from 6-hydroxy-2-naphthoic acid and structural unit derived from an aromatic dihydroxy compound, an aromatic dicarboxylic acid and/or an aliphatic dicarboxylic acid; liquid crystalline polyester having structural unit derived from p-hydroxybenzoic acid, structural unit derived from 4,4'-dihydroxybiphenyl and structural unit derived from an aromatic dicarboxylic acid, such as terephthalic acid or isophthalic acid and/or an aliphatic dicarboxylic acid, such as adipic acid or sebacic acid; liquid crystalline polyester having structural unit derived from p-hydroxybenzoic acid, structural unit derived from 4,4'-dihydroxybiphenyl, structural unit derived from hydroquinone and structural unit derived from an aromatic dicarboxylic acid, such as terephthalic acid or isophthalic acid and/or an aliphatic dicarboxylic acid, such as adipic acid or sebacic acid; liquid crystalline polyester having structural unit derived from p-hydroxybenzoic acid, structural unit derived from ethylene glycol and structural unit derived from terephthalic acid and/or isophthalic acid; liquid crystalline polyester having structural unit derived from p-hydroxybenzoic acid, structural unit derived from ethylene glycol, structural unit derived from 4,4'-dihydroxybiphenyl and structural unit derived from terephthalic acid and/or an aliphatic dicarboxylic acid, such as adipic acid or sebacic acid; liquid crystalline polyester having structural unit derived from p-hydroxybenzoic acid, structural unit derived from ethylene glycol, structural unit derived from an aromatic dihydroxy compound and structural unit derived from an aromatic dicarboxylic acid, such as terephthalic acid, isophthalic acid, or 2,6-naphthalenedicarboxylic acid; and liquid crystalline polyester having structural unit derived from 6-hydroxy-2-naphthoic acid, structural unit derived from 4,4'-dihydroxybiphenyl and structural unit derived from 2,6-naphthalenedicarboxylic acid.

Among these liquid crystalline polyesters, liquid crystalline polyester having structural units (I), (II), (III), (IV) and (V) shown below is preferable. This liquid crystalline polyester has excellent rigidity at high temperatures, thus further improving the creep property of a molded product. This also further improves the dielectric breakdown strength of a molded product. Additionally, using this liquid crystalline polyester, in combination with the production method described later, enables the shape of mica contained in the liquid crystalline polyester composition to be more readily controlled to a desired range. This accordingly improves the variation in flowability of the liquid crystalline polyester composition and reduces the anisotropy

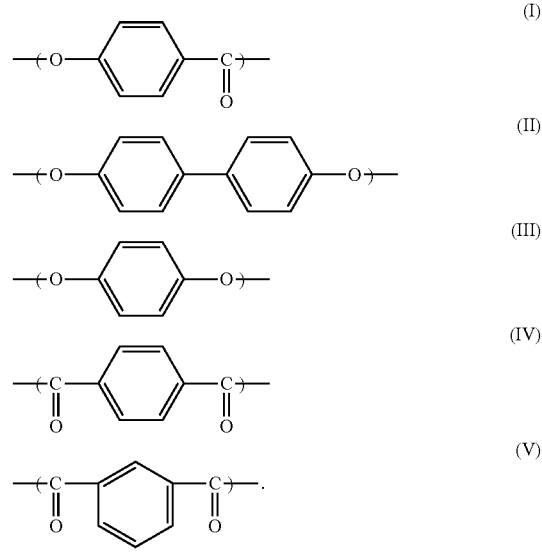

The above structural unit (I) represents p-hydroxybenzoic acid-derived structural unit; the structural unit (II) represents 4,4'-dihydroxybiphenyl-derived structural unit; the structural unit (III) represents hydroquinone-derived structural unit; the structural unit (IV) represents terephthalic acid-derived structural unit; and the structural unit (V) represents isophthalic acid-derived structural unit.

The content of the structural unit (I) is preferably 65 to 80 mol % relative to the total amount of the structural units (I), (II) and (III). Specifically, for the improved wettability with glass fiber, the content of the structural unit (I) is more preferably 68 to 78 mol %.

The content of the structural unit (II) is preferably 55 to 85 mol % relative to the total amount of the structural units (II) and (III). Specifically, for the improved dimensional stability and the further improved metal adhesion, the content of the structural unit (II) is more preferably 55 to 78 mol % and most preferably 58 to 73 mol %.

The content of the structural unit (IV) is preferably 50 to 95 mol % relative to the total amount of the structural units (IV) and (V). Specifically, for the improved rigidity at high temperatures and the further improved creep property, the content of the structural unit (IV) is more preferably 55 to 90 mol % and most preferably 60 to 85 mol %.

The total amount of the structural units (II) and (III) is preferably substantially equimolar with the total amount of the structural units (IV) and (V). The term "substantially equimolar" herein means that the structural units forming the polymer main chain except the terminal groups are equimolar. Even the non-equimolar composition when including the structural units of the terminal groups may accordingly satisfy the "substantially equimolar" condition. An excess of dicarboxylic acid component or dihydroxy component may be added to control the terminal groups of the polymer.

The above liquid crystalline polyester may be produced by a known polyester polycondensation method. For example, the following production methods are preferably employed:

(1) method of producing the liquid crystalline polyester by deacetylation polycondensation reaction from p-acetoxybenzoic acid, 4,4'-diacetoxybiphenyl, diacetoxybenzene, terephthalic acid and isophthalic acid;

(2) method of producing the liquid crystalline polyester by acylation of phenolic hydroxyl group though reactions of p-hydroxybenzoic acid, 4,4'-dihydroxybiphenyl, hydroquinone, terephthalic acid and isophthalic with acetic anhydride and subsequent deacetylation polycondensation reaction;

(3) method of producing the liquid crystalline polyester by dephenolation polycondensation reaction from phenyl p-hydroxybenzoate, 4,4'-dihydroxybiphenyl, hydroquinone, diphenyl terephthalate and diphenyl isophthalate; and (4) method of producing the liquid crystalline polyester by diphenyl esterification through reactions of p-hydroxybenzoic acid and an aromatic dicarboxylic acid, such as terephthalic acid or isophthalic acid with specified amounts of diphenyl carbonate and subsequent dephenolation polycondensation reaction with addition of an aromatic dihydroxy compound, such as 4,4'-dihydroxybiphenyl or hydroquinone.

In the process of producing the liquid crystalline polyester by deacetylation polycondensation reaction, the melt polymerization method is preferably employed to complete the polycondensation reaction under reduced pressure at a temperature at which the liquid crystalline polyester melts. For example, specified amounts of p-hydroxybenzoic acid, 4,4'-dihydroxybiphenyl, hydroquinone, terephthalic acid, isophthalic acid and acetic anhydride may be mixed in a reaction vessel and heated with stirring in nitrogen atmosphere for acetylation of the hydroxyl group. The temperature of the reaction mixture may then be further raised to the melt temperature of the liquid crystalline polyester, and the polycondensation reaction may be completed under reduced pressure. The reaction vessel may be equipped with stirring blades, may be equipped with a distillation pipe, and may be equipped with an outlet provided in its lower portion.

At a temperature at which the resulting polymer melts, the reaction vessel may be pressurized to, for example, about 1.0 kg/cm$^2$ (0.1 MPa), and the resulting polymer may be discharged in the form of strands from the outlet provided in the lower portion of the reaction vessel. The melt polymerization method is advantageous to produce the homogeneous polymer and preferably gives the excellent polymer with less gas evolution.

The polycondensation reaction of the liquid crystalline polyester proceeds without a catalyst, but a metal compound, such as tin (II) acetate, tetrabutyl titanate, potassium acetate, sodium acetate, antimony trioxide, or metal magnesium may be used as the catalyst.

The contents of the respective structural units are calculable from an area ratio of peaks corresponding to the respective structural units by $^1$H-NMR spectroscopy, in which the liquid crystalline polyester is weighed in an NMR (nuclear magnetic resonance) sample tube and is dissolved in a liquid crystalline polyester-soluble solvent (for example, pentafluorophenol/tetrachloroethane-$d_2$ mixture).

A melting point (Tm) is determinable with a differential scanning calorimeter. After observation of an endothermic peak temperature (Tm1) in measurement with heating the liquid crystalline polyester at a rate of 40° C./minute from room temperature, the temperature is sequentially maintained at Tm1+20° C. for 5 minutes, then decreased to room temperature at a rate of 20° C./minute, and increased again at a rate of 20° C./minute. An endothermic peak temperature (Tm2) observed during the re-heating process is determined as the melting point (Tm).

The melt viscosity of the liquid crystalline polyester is preferably 1 to 200 Pa·s, is more preferably 5 to 100 Pa·s and is especially preferably 10 to 50 Pa·s. The melt viscosity herein is measured with a Koka-type flow tester (constant-load orifice-type flow tester) at a shear rate of 1000/s under the temperature condition of the melting point of the liquid crystalline polyester+10° C.

The liquid crystalline polyester composition contains 10 to 100 parts by weight of mica relative to 100 parts by weight of the liquid crystalline polyester. The mica content of less than 10 parts by weight significantly reduces the creep property of a molded product and also reduces the dielectric breakdown strength of the molded product. Furthermore, the mica content of less than 10 parts by weight increases the anisotropy of the molded product, thus reducing the dimensional stability and increasing the difference in coefficient of linear expansion between a resin flow direction (MD direction) and a direction (TD direction) perpendicular to the resin flow direction. The mica content is preferably not less than 25 parts by weight and is more preferably not less than 40 parts by weight. The mica content of greater than 100 parts by weight, on the other hand, increases aggregates of mica and thereby reduces the dielectric breakdown strength of a molded product. The mica content is preferably not greater than 85 parts by weight and is more preferably not greater than 75 parts by weight.

Additionally, it is important that the rate in number of mica with the ratio (d1/d2) of a long diameter (d1) to a short diameter (d2) that is greater than 2.0, to the entire mica content contained in the liquid crystalline polyester composition is not higher than 20%. The conceptual view of the long diameter (d1) and the short diameter (d2) of mica is illustrated in FIG. 1. The long diameter (d1) of mica means the maximum diameter, and the short diameter (d2) means the length of a shortest line segment among line segments passing through the center (M) of the long diameter (d1) line segment in a plane including the long diameter (d1). In FIG. 1, T represents the thickness of mica. The ratio (d1/d2) approaching to 1 indicates the shape closer to a circular shape. The rate of the mica with the ratio (d1/d2) of greater than 2.0 to the entire mica content contained in the liquid crystalline polyester composition that exceeds 20% reduces the creep property of a molded product. Additionally, the rate in number of the mica with (d1/d2) of greater than 2.0 exceeding 20% increases the difference in coefficient of linear expansion between the MD direction and the TD direction of a molded product. The rate of the mica with (d1/d2) of greater than 2.0 is preferably not higher than 15% and is more preferably not higher than 10%.

The volume-average particle diameter of mica contained in the liquid crystalline polyester composition is preferably not shorter than 5 μm, is more preferably not shorter than 10 μm and is furthermore preferably not shorter than 15 μm, with the object of further improving the creep property of a molded product by the reinforcement effect of mica. With the object of controlling the variation in thin-wall flowability, on the other hand, the volume-average particle diameter is preferably not longer than 50 μm, is more preferably not longer than 30 μm and is furthermore preferably not longer than 20 μm.

The ratio (D50/D10) of a 50% cumulative frequency particle diameter (D50) to a 10% cumulative frequency particle diameter (D10) in a cumulative volume size distribution curve of mica contained in the liquid crystalline polyester composition has a distribution of mica with the median diameter and mica with the smaller particle diameter. The greater ratio D50/D10 indicates the higher content of mica with the small particle diameter, while the smaller ratio D50/D10 indicates the lower content of mica with the small particle diameter. With the object of controlling friction generated between the liquid crystalline polyester and the mica and further improving the flowability, the ratio D50/D10 is preferably not less than 2.00, is more preferably not less than 2.20 and is furthermore preferably not less than 2.40. With the object of controlling the variation in thin-wall flowability, on the other hand, the ratio D50/D10 is preferably not greater than 3.00, is more preferably not greater than 2.80 and is furthermore preferably not greater than 2.60.

The weight-average thickness of mica contained in the liquid crystalline polyester composition is preferably not less than 0.10 μm, is more preferably not less than 0.20 μm and is furthermore preferably not less than 0.30 μm, with the object of further improving the creep property of a molded product. With the object of homogeneously dispersing mica and further improving the dielectric breakdown strength of a molded product, on the other hand, the weight-average thickness is preferably not greater than 1.0 μm, is more preferably not greater than 0.70 μm and is furthermore preferably not greater than 0.50 μm.

The weight fraction of mica having the thickness of not less than 1.0 μm to the entire mica content contained in the liquid crystalline polyester composition is preferably not less than 1.0%, is more preferably not less than 3.0% and is furthermore preferably not less than 5.0%, with the object of further improving the creep property of a molded product. To homogeneously disperse mica and further improve the dielectric breakdown strength of a molded product, on the other hand, the weight fraction is preferably not greater than 30.0%, is more preferably not greater than 20.0% and is furthermore preferably not greater than 10.0%.

The long diameter (d1), the short diameter (d2), their ratio (d1/d2), the volume-average particle diameter, the ratio (D50/D10) of the 50% cumulative frequency particle diameter (D50) to the 10% cumulative frequency particle diameter (D10), the weight-average thickness of mica and the weight fraction of the mica having the thickness of not less than 1.0 μm contained in the liquid crystalline polyester composition herein may be determined by the following methods. The procedure first heats 50 grams of the resin composition at 550° C. for 3 hours to remove the resin component and obtain mica. When an inorganic fibrous filler is contained in the resin composition, mica may be separated from the inorganic fibrous filler by the difference in specific gravity. For example, when glass fiber is contained in the resin composition, a mixture of mica and glass fiber is taken out and is dispersed in a mixed solution consisting of 88% by volume of 1,1,2,2-tetrabromoethane (specific gravity: 2.970) and 12% by volume of ethanol (specific gravity: 0.789). After centrifugation of the dispersion at a rotation speed of 10000 rpm for 5 minutes, the floating glass fibers are removed by decantation, and the mica sediment is obtained by filtration. The procedure then observes the obtained mica at the 500-fold magnification with an electron microscope and measures the long diameter (d1) and the short diameter (d2) of 500 or more pieces of mica selected at random. The short diameter (d2) may be determined by measuring the length of a shortest line segment among line segments passing through the center (M) of the long diameter (d1) in the plane including the long diameter (d1). The volume-average particle diameter is measured with a laser diffraction/scattering particle size analyzer ("LA-300" manufactured by HORIBA, Ltd.) after 100 mg of mica is weighed and is dispersed in water. The ratio (D50/D10) of the 50% cumulative frequency particle diameter (D50) to the 10% cumulative frequency particle diameter (D10) is calculated from a cumulative volume size distribution curve obtained by measurement of the volume-average particle diameter. The weight-average thickness of mica is determined by observing mica at the 1200-fold magnification with an electron microscope and measuring the thickness of 500 or more pieces of mica selected at random. The weight-average thickness is expressed by $(\Sigma ni \cdot Ti^2)/(\Sigma ni \cdot Ti)$. Herein Ti represents the thickness of one piece of mica; and ni is calculated as (number of mica pieces having the thickness Ti)/(total number of mica pieces measured). The weight fraction of the mica having the thickness of not less than 1.0 μm is expressed by $(\Sigma nk \cdot Tk^2)/(\Sigma ni \cdot Ti^2)$. Herein Tk represents the thickness of one piece of mica having the thickness of not less than 1.0 μm; and nk is calculated as (number of mica pieces having the thickness Tk)/(total number of mica pieces measured).

To control the shape and the distribution of the mica (B) contained in the liquid crystalline polyester composition to respective desired ranges, the volume-average particle diameter of mica prior to mixing is preferably not greater than 70 μm, is more preferably not greater than 50 μm and is furthermore preferably not greater than 30 μm. To reduce aggregates and improve the dielectric breakdown strength of a molded product, on the other hand, the volume-average particle diameter is preferably not less than 10 μm, is more preferably not less than 15 μm and is furthermore preferably not less than 20 μm.

The mica may be any of naturally-produced white mica, black mica and bronze mica and artificially-produced synthetic micas. Two or more different types of such micas may be used in combination.

Available examples of the production method of mica include wet grinding such as water-jet grinding and wet crushing with a grindstone; and dry grinding such as dry ball mill grinding, pressure roller mill grinding, air jet mill grinding and dry grinding with an impact grinder like an atomizer.

To improve the wettability between the mica and the liquid crystalline polyester, the surface of mica may be treated with, for example, a silane coupling agent. The mica used herein may be mica subjected to heat treatment for the purpose of removing impurities and hardening mica.

The liquid crystalline polyester composition may optionally contain an inorganic fibrous filler (C). Containing the inorganic fibrous filler slightly decreases the flowability, but increases the rigidity of a molded product obtained from the liquid crystalline polyester composition, thus further improving the creep property.

Available examples of the inorganic fibrous filler used as the component (C) include glass fiber, milled glass fiber, carbon fiber, aromatic polyamide fiber, potassium titanate fiber, plaster fiber, brass fiber, stainless steel fiber, steel fiber, ceramic fiber, boron whisker fiber and asbestos fiber. Two or more different types of such fibers may be used in combination. Among these, especially preferable are glass fiber, milled glass fiber and PAN-derived carbon fiber.

The number-average fiber length of the inorganic fibrous filler contained in the liquid crystalline polyester composition is preferably not shorter than 30 μm, which reduces the anisotropy of a molded product obtained from the liquid crystalline polyester composition. The number-average fiber length is preferably not shorter than 100 μm and is more preferably not shorter than 200 μm. From the standpoint of flowability of the liquid crystalline polyester composition, on the other hand, the number-average fiber length is preferably not longer than 500 μm, is more preferably not longer than 450 μm and is furthermore preferably not longer than 400 μm.

The insufficient dispersibility of the inorganic fibrous filler leads to the insufficient effect of reducing the anisotropy. The effective method to improve the dispersibility of the inorganic fibrous filler may increase the screw rotation speed during melt-kneading with the resin or may increase the shear force with decreasing the cylinder temperature and increasing the melt viscosity of the molten resin. The effective method of improve the compatibility with the resin may apply a coupling agent on the inorganic fibrous filler.

The number-average fiber length of the inorganic fibrous filler contained in the liquid crystalline polyester composition herein may be determined by the following method that utilizes the difference in specific gravity between the inorganic fibrous filler and the mica. For example, when glass fiber is used as the inorganic fibrous filler, the method first heats the resin composition at 550° C. for 3 hours to remove the resin component and take out the mica and the glass fiber contained in the liquid crystalline polyester composition in the state of a mixture. The mixture is dispersed in a mixed solution consisting of 88% by volume of 1,1,2,2-tetrabromoethane (specific gravity: 2.970) and 12% by volume of ethanol (specific gravity: 0.789). After centrifugation of the dispersion at 10000 rpm for 5 minutes, the floating glass fibers are separated by decantation. The glass fibers are then separated from the solvent by filtration. The method scatters the glass fibers on a microscope slide such that the respective fibers are not piled one upon another, takes a photomicrograph at the 800-fold magnification, measures the fiber lengths of 500 or more fibers selected at random from the photomicrograph and calculates the number-average fiber length. When any inorganic fibrous filler other than the glass fiber is used, the inorganic fibrous filler may similarly be separated from mica by utilizing the difference in specific gravity.

The content of the inorganic fibrous filler is preferably 10 to 100 parts by weight relative to 100 parts by weight of the liquid crystalline polyester. The content of the inorganic fibrous filler of not less than 10 parts by weight preferably reduces the anisotropy of a molded product. The content of the inorganic fibrous filler is preferably not less than 20 parts by weight and is more preferably not less than 30 parts by weight. The content of the inorganic fibrous filler of not greater than 100 parts by weight keeps the flowability of the liquid crystalline polyester at the higher level. The content of the inorganic fibrous filler is preferably not greater than 75 parts by weight and is more preferably not greater than 50 parts by weight.

In the case of addition of the inorganic fibrous filler, the ratio (g/m) of the content of the inorganic fibrous filler (g) to the content of mica (m) is preferably in the range of 0.3 to 2.5. Especially the ratio (g/m) in the range of 0.3 to 0.9 is preferable for significantly improving the dielectric breakdown strength. The ratio (g/m) in the range of 1.1 to 2.5 is preferable, on the other hand, for significantly improving the anisotropy of a molded product.

The liquid crystalline polyester composition may additionally contain a filler other than the inorganic fibrous filler to such an extent that does not interfere with the desired effect. The filler other than the inorganic fibrous filler may be, for example, powdery, granular or plate-like inorganic filler such as talc, graphite, calcium carbonate, glass bead, glass microballoon, clay, wollastonite, titanium oxide or molybdenum disulfide. Two or more different types of such fillers may be used in combination.

The liquid crystalline polyester composition may additionally contain any of general additives selected among: antioxidants and heat stabilizers (e.g., hindered phenol, hydroquinone, phosphites and their substitutes); UV absorbers (e.g., resorcinol, salicylate, benzotriazole and benzophenone); lubricants and mold release agents (e.g., montanic acid and its salts, its esters and its half esters, stearyl alcohol, stearamide and polyethylene wax); coloring agents including dyes (e.g., Nitrosine) and pigments (e.g., cadmium sulfide, phthalocyanine and carbon black); plasticizers; and antistatic agents. Another thermoplastic resin may be added to the liquid crystalline polyester composition. Containing any of such additives to such an extent that does not interfere with the desired effect can provide specific properties.

The liquid crystalline polyester composition may be obtained, for example, by melt-kneading the liquid crystalline polyester, the mica and the other components such as the inorganic fibrous filler as needed basis. The method employed for melt-kneading may be a method using, for example, any of a Banbury mixer, a rubber roller, a kneader, a single-screw extruder and a twin-screw extruder. The temperature of melt-kneading is preferably 200 to 350° C. To knead the mica homogeneously with high dispersibility, using the extruder is preferable, using the twin-screw extruder is more preferable, and using the twin-screw extruder with an intermediate supply port is furthermore preferable.

The method employed to control the long diameter, the short diameter, the volume-average particle diameter and the weight-average thickness of the mica contained in the liquid crystalline polyester composition to the respective desired ranges described above may be a method of melt-kneading the respective components at a circumferential velocity of 0.65 to 1.30 m/s with a screw arrange incorporating at least one kneading disk at such a temperature that does not thermally degrade the liquid crystalline polyester. Incorporating the kneading disk enables more efficient melt-kneading and improves the dispersibility of the mica in the composition. The screw arrangement incorporating two or more kneading disks is more preferable.

The circumferential velocity means a speed of the rotating object at the maximum radius position and may be calculated from the screw diameter and the screw rotation speed for an extruder according to Equation 1:

circumferential velocity (m/s)=screw diameter (mm)× 3.14×screw rotation speed (rpm)/60/1000    (1).

The circumferential velocity is preferably not lower than 0.65 m/s, is more preferably not lower than 0.70 m/s and is furthermore preferably not lower than 0.75 m/s, to control the ratio (d1/d2) of the long diameter (d1) to the short diameter (d2), the volume-average particle diameter of mica, the ratio (D50/D10) of the 50% cumulative frequency particle diameter (D50) to the 10% cumulative frequency particle diameter (D10) in the cumulative volume size distribution curve and the weight fraction of the mica having the thickness of not less than 1.0 µm to the respective desired ranges. To control the ratio (d1/d2) of the long diameter (d1) to the short diameter (d2) and the volume-average particle diameter of mica to the respective desired ranges and to control the ratio (D50/D10) of the 50% cumulative frequency particle diameter (D50) to the 10% cumulative frequency particle diameter (D10) in the cumulative volume size distribution curve and the weight-average thickness to the respective desired ranges, on the other hand, the circumferential velocity is preferably not higher than 1.30 m/s, is more preferably not higher than 1.15 m/s and is furthermore preferably not higher than 1.00 m/s.

Another available method may supply the mica from an intermediate supply port that is placed on the upstream side from the center along the whole length from a supply port of the extruder drive system side to nozzles of the resin discharge side. Yet another available method may pre-mix part of the mica to be supplied with the liquid crystalline polyester and supply the pre-mixture from the supply port of the extruder drive system side, while supplying the remaining part of the mica from the intermediate supply port.

The contents of the mica, the inorganic fibrous filler and the other additives contained in the liquid crystalline polyester composition obtained by the above method are generally equal to the amounts added for production of the liquid crystalline polyester composition.

The liquid crystalline polyester composition may be formed to various molded products by any of known molding methods. Injection molding the liquid crystalline polyester composition is especially preferable, because of its excellent thin-wall flowability.

The resulting molded product has the excellent creep property and the improved dielectric breakdown strength and is thus favorably used for composite molded products with metals. The metal composite molded product has a resin part obtained by injection molding the resin composition and a metal part joined thereto. The metal part is used for conductive parts, such as terminals of electric and electronic components, coils, motors and various sensors. The metal used for the metal part is preferably copper, silver, gold, aluminum or any of these alloys, because of their excellent workability, corrosion resistance, thermal conductivity and electric conductivity.

As concrete examples, the metal composite molded product may be used for electric and electronic components, such as various gears, various casings, sensors, LED components, liquid crystal backlight bobbins, connectors, sockets, resistors, relay cases, relay spools and bases, switches, coil bobbins, capacitors, variable capacitor cases, optical pickups, oscillators, various terminal strips and boards, transformers, plugs, printed circuit boards, tuners, speakers, microphones, headphones, small motors, magnetic head bases, power modules, housings, semiconductors, liquid crystal display components, FDD carriages, FDD chassis, HDD components, motor brush holders, parabola antennas, and computer components; domestic and office electric appliance components, such as video tape recorder components, TV set components (plasma, organic EL and liquid crystal), irons, hair dryers, rice cooker components, microwave oven components, acoustic components, audio equipment components for audios, laserdiscs and compact disks, lighting components, refrigerator components, and air conditioner components; optical equipment and precision machine components, such as office computer components, telephone components, facsimile components, copy machine components, cleaning jigs, various bearings including oilless bearings, stern bearings and submerged bearings, motor components, machine components for lighters and typewriters, microscopes, binoculars, cameras and watches; and automobile and vehicle components, such as alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for air conditioners, motor insulators for air conditioners, hot air flow control valves, brush holders for radiator motors, water pump impellers, turbine vanes, wiper motor components, distributors, starter switches, starter relays, transmission wire harnesses, windshield washer fluid nozzles, air conditioner panel switch plates, fuel solenoid valve coils, fuse connectors, ECU connectors, horn terminals, electric component insulators, step motor rotors, lamp sockets, lamp reflectors, lamp housings, brake pistons, solenoid bobbins, engine oil filters and ignition cases. Film applications include films for magnetic recording media. Sheet applications include door trim, shock-absorbing materials for the bumper and the side frame, seat materials, pillars, fuel tanks, brake hoses, windshield washer fluid nozzles and air conditioner refrigerant tubes. Because of its excellent surface appearance, the metal composite molded product is favorably applicable to slide components such as camera module components, optical pickup lens holders and auto focus camera lens modules.

The molded product is not restricted to the metal composite molded products described above but is useful for film applications such as photo films, capacitor films, electrical insulating films, wrapping films, drawing films, and ribbon films and sheet applications such as car interior ceiling, pad materials for the instrument panel and sound absorbing pads for the hood back.

EXAMPLES

The following describes advantageous effects in more detail with reference to examples.

The composition analysis and the property evaluation of the liquid crystalline polyester were performed by the following methods:

(1) Composition Analysis of Liquid Crystalline Polyester

Composition analysis of the liquid crystalline polyester was performed by $^1$H-nuclear magnetic resonance spectroscopy ($^1$H-NMR). The liquid crystalline polyester of 50 mg was weighed in an NMR sample tube, was dissolved in 800 µl of a solvent (pentafluorophenol/1,1,2,2,-tetrachloroethane-$d_2$=65/35 (ratio by weight) mixed solvent), and was subjected to $^1$H-NMR spectroscopy under the conditions of the spectral frequency of 500 MHz and the temperature of 80° C. with UNITY INOVA 500 NMR spectrometer (manufactured by Varian, Inc). The composition of the liquid crystalline polyester was analyzed from the ratio of the areas of peaks corresponding to the respective structural units observed in the spectral range of 7 to 9.5 ppm.

(2) Measurement of Melting Points (Tm) of Liquid Crystalline Polyester

The melting point (Tm) was measured by differential scanning calorimeter DSC-7 (manufactured by PerkinElmer, Inc). After observation of an endothermic peak temperature (Tm1) in measurement with heating the liquid crystalline polyester at a rate of 40° C./minute from room temperature, the temperature was sequentially maintained at Tm1+20° C. for 5 minutes, then decreased to room temperature at a rate of 20° C./minute, and increased again at a rate of 20° C./minute. An endothermic peak temperature (Tm2) observed during the re-heating process was specified as the melting point (Tm).

(3) Measurement of Melt Viscosity of Liquid Crystalline Polyester

The melt viscosity was measured under the conditions of the temperature set to the melting point of the liquid crystalline polyester+10° C. and the shear rate of 1000/second by Koka-type flow tester CFT-500D (orifice: 0.5φ×10 mm) (manufactured by Shimadzu Corporation).

The following shows liquid crystalline polyesters (A), micas (B) and inorganic fibrous fillers (C) used in respective Examples and Comparative Examples.

(A) Liquid Crystalline Polyester

Reference Example 1

Synthesis of Liquid Crystalline Polyester (A-1)

In a 5 L reaction vessel with stirring blades and a distillation pipe, 870 grams (6.30 mol) of p-hydroxybenzoic acid, 327 grams (1.89 mol) of 4,4'-dihydroxybiphenyl, 89 grams (0.81 mol) of hydroquinone, 292 grams (1.76 mol) of terephthalic acid, 157 grams (0.95 mol) of isophthalic acid and 1367 grams of acetic anhydride (1.03 equivalents of the total amount of phenolic hydroxyl group) were mixed, were reacted with stirring in nitrogen atmosphere at 145° C. for 2 hours and were then heated to 320° C. in 4 hours. After that, with keeping the polymerization temperature at 320° C., the reaction vessel was depressurized to 1.0 mmHg (133 Pa) in 1.0 hour and the reaction further proceeded for another 90 minutes. The polycondensation was completed when the torque required for stirring reached 15 kg·cm. The reaction vessel was then pressurized to 1.0 kg/cm² (0.1 MPa), and the polymer was formed in strands through a nozzle having a circular outlet of 10 mm in diameter, and was pelletized with a cutter to the liquid crystalline polyester (A-1).

The composition analysis was performed for this liquid crystalline polyester (A-1). The liquid crystalline polyester (A-1) had p-oxybenzoate unit (structural unit (I)), 4,4'-dioxybiphenyl unit (structural unit (II)), 1,4-dioxybenzene unit (structural unit (III)), terephthalate unit (structural unit (IV)) and isophthalate unit (structural unit (V)). The liquid crystalline polyester (A-1) contained 70 mol % of the p-oxybenzoate unit (structural unit (I)) relative to the total amount of the p-oxybenzoate unit (structural unit (I)), the 4,4'-dioxybiphenyl unit (structural unit (II)) and the 1,4-dioxybenzene unit (structural unit (III)). The liquid crystalline polyester (A-1) also contained 70 mol % of the 4,4'-dioxybiphenyl unit (structural unit (II)) relative to the total amount of the 4,4'-dioxybiphenyl unit (structural unit (II)) and the 1,4-dioxybenzene unit (structural unit (III)). The liquid crystalline polyester (A-1) also contained 65 mol % of the terephthalate unit (structural unit (IV)) relative to the total amount of the terephthalate unit (structural unit (IV)) and the isophthalate unit (structural unit (V)). The total amount of the 4,4'-dioxybiphenyl unit (structural unit (II)) and the 1,4-dioxybenzene unit (structural unit (III)) was 23 mol % relative to the total amount of the structural units. The total amount of the terephthalate unit (structural unit (IV)) and the isophthalate unit (structural unit (V)) was 23 mol % relative to the total amount of the structural units. The melting point (Tm) of the liquid crystalline polyester (A-1) was 314° C. The melt viscosity measured at the temperature of 324° C. and the shear rate of 1000/s with the Koka-type flow tester (orifice of 0.5φ×10 mm) was 20 Pa·s.

Reference Example 2

Synthesis of Liquid Crystalline Polyester (A-2)

In a polymerization vessel, 994 grams (7.20 mol) of p-hydroxybenzoic acid, 126 grams (0.68 mol) of 4,4'-dihydroxybiphenyl, 112 grams (0.68 mol) of terephthalic acid, 159 grams (1.13 mol) of polyethylene terephthalate having the intrinsic viscosity of about 0.6 dl/g and 960 grams of acetic anhydride (1.10 equivalents of the total amount of phenolic hydroxyl group) were mixed, were reacted with stirring in nitrogen atmosphere for 3 hours with heating to 150° C. The reaction mixture was subsequently heated from 150° C. to 250° C. in 2 hours and further heated from 250° C. to 330° C. in 1.5 hours, was subjected to pressure reduction to 1.0 mmHg (133 Pa) at 325° C. in 1.5 hours, and was further stirred for 0.25 hours. The polycondensation was completed when the torque required for stirring reached 12 kg·cm. The reaction vessel was then pressurized to 1.0 kg/cm² (0.1 MPa), and the polymer was formed in strands through a nozzle having a circular outlet of 10 mm in diameter, and was pelletized with a cutter to the liquid crystalline polyester (A-2).

The composition analysis was performed for this liquid crystalline polyester (A-2). The liquid crystalline polyester had 66.7 mol % of the p-oxybenzoate unit (structural unit (I)), 6.3 mol % of the 4,4'-dioxybiphenyl unit (structural unit (II)), 10.4 mol % of polyethylene terephthalate-derived ethylenedioxy unit and 16.6 mol % of the terephthalate unit (structural unit (IV)). The melting point (Tm) was 314° C. The melt viscosity measured at the temperature of 324° C. and the shear rate of 1000/s with the Koka-type flow tester (orifice of 0.5φ×10 mm) was 25 Pa·s.

Reference Example 3

Synthesis of Liquid Crystalline Polyester (A-3)

According to JP S54-77691A, in a reaction vessel with stirring blades and a distillation pipe, 921 parts by weight of p-acetoxybenzoic acid and 435 parts by weight of 6-acetoxynaphthoic acid were mixed and polycondensated. The resulting liquid crystalline polyester (A-3) had 57 mol equivalents of p-acetoxybenzoic acid-derived structural unit (structural unit (I)) and 22 mol equivalents of 6-acetoxynaphthoic acid-derived structural unit. The melting point (Tm) was 283° C. The melt viscosity measured at the temperature of 293° C. and the shear rate of 1000/s with the Koka-type flow tester (orifice of 0.5φ×10 mm) was 30 Pa·s.

(B) Mica
- (B-1) "A-21" manufactured by Yamaguchi Mica Co., Ltd. (volume-average particle diameter: 22 μm);
- (B-2) "A-41" manufactured by Yamaguchi Mica Co., Ltd. (volume-average particle diameter: 47 μm); and
- (B-3) "M-200W" manufactured by Repco Inc. (volume-average particle diameter: 53 μm).

(C) Glass Fiber
- (C-1) "chopped strand ECS03 T-747H" manufactured by Nippon Electric Glass Co., Ltd. (number-average fiber length: 3.0 mm, number-average fiber diameter: 10.5 μm); and
- (C-2) "milled fiber EPG70M-01N" manufactured by Nippon Electric Glass Co., Ltd. (number-average fiber length: 70 μm, number-average fiber diameter: 9 μm).

Liquid crystalline polyester compositions of Examples and Comparative Examples were produced from the liquid crystalline polyester (A), the mica (B) and optionally the inorganic fibrous filler (C) described above. The properties of the respective liquid crystalline polyester compositions were evaluated by the following procedures.

(1) Flexural Creep Property

Each of the liquid crystalline resin compositions obtained in respective Examples and Comparative Examples was injection molded to a test piece of 12.6 mm in width×127 mm in length×3.2 mm in thickness by FANUC ROBOSHOT α-30C (manufactured by FANUC Corporation) under the conditions of the cylinder temperature set to the melting point of the liquid crystalline polyester+10° C. and the die temperature of 90° C. Each test piece thus obtained was fixed in a "flexural creep tester CP-L-20" manufactured by Baldwin Japan Ltd. The flexural modulus of each test piece was measured in conformity with ASTM D-790 under the conditions of the applied load of 20 MPa, the loading time of 150 hours and the measuring temperature of 23° C. or 150° C.

(2) Dielectric Breakdown Strength

Each of the liquid crystalline resin compositions obtained in respective Examples and Comparative Examples was injection molded to a square plate of 100 mm in length×100 mm in width×3 mm in thickness by SE50DUZ (manufactured by Sumitomo Heavy Industries, Ltd.) under the conditions of the cylinder temperature set to the melting point of the liquid crystalline polyester+10° C. and the die temperature of 90° C. Each square plate thus obtained was fixed in "HAT-300-100R" manufactured by Hitachi Chemical Techno Service Co., Ltd. and was subjected to a dielectric breakdown test (short time) in conformity with JIS-C2110 (established on Jan. 20, 2010). The applied voltage was increased from 0 at such a constant rate as to cause breakdown of the specimen in 10 to 20 seconds on average. The oil temperature was set to 23° C., and 25 mmφ columnar electrodes were employed for both the upper electrode and the lower electrode.

(3) Flowability

Each of the liquid crystalline resin compositions obtained in respective Examples and Comparative Examples was injection molded at an injection speed of 400 m/s by FANUC ROBOSHOT α-30C (manufactured by FANUC Corporation) with a die, which is capable of producing a molded product of 5.0 mm in width×50 mm in length×0.2 mm in thickness, under the conditions of the cylinder temperature set to the melting point Tm of the liquid crystalline polyester+20° C. and the die temperature of 90° C., and the flow length of 5.0 mm in width×0.2 mm in thickness was measured. Twenty shots of such molding were repeated, and the maximum flow length and the minimum flow length of 5.0 mm in width×0.2 mm in thickness among the shots were measured. The smaller difference between the maximum flow length and the minimum flow length indicates the less variation in flowability.

(4) Coefficient of Linear Expansion

Each of the liquid crystalline resin compositions obtained in respective Examples and Comparative Examples was injection molded at an injection speed of 100 mm/s to a square plate of 80 mm in length×80 mm in width×3 mm in thickness by FANUC ROBOSHOT α-30C (manufactured by FANUC Corporation) under the conditions of the cylinder temperature set to the melting point of the liquid crystalline polyester+10° C. and the die temperature of 90° C. Specimens of about 5 mm×12 mm were cut out in a resin flow direction (MD) and in a perpendicular direction (TD) to the flow direction from a center area of each square plate thus obtained, and their surfaces were polished with sandpaper. The measurement was performed with "TMA/SS6100" manufactured by Seiko Instruments Inc. The measurement conditions were to keep each of the specimens in nitrogen atmosphere at 30° C. for 10 minutes and subsequently heat the specimen at a rate of temperature increase of 5° C./minute in the temperature range of 30° C. to 200° C. The coefficient of linear expansion was then calculated in the temperature range of 23 to 200° C.

The following describes the liquid crystalline polyester compositions of Examples 1 to 10 and Comparative Examples 1 to 4 produced from the liquid crystalline polyester (A) and the mica (B) described above.

Examples 1 and 5 to 8 and Comparative Examples 1 and 2

An intermeshed co-rotation-type twin-screw extruder with a screw of 45.8 mm in diameter and with cylinders C1 (main feeder-side heater) to C12 (die-side heater) was used, where an intermediate supply port was placed in the cylinder C6 and a vacuum vent was placed in the cylinder C8. By using a screw arrangement with kneading disks built in the cylinders C3 and C7, the liquid crystalline polyester (A) shown in Table 1, (A-1), was loaded from the main feeder (supply port 1), while the mica (B) was added from the intermediate supply port (supply port 2). The mixture was melt-kneaded at the cylinder temperature set to the melting point of the liquid crystalline polyester+10° C. and the screw rotation speed adjusted to achieve the circumferential velocity of 0.85 mm/s and was then formed to pellets with a strand cutter. The circumferential velocity was calculated according to Equation 1:

$$\text{circumferential velocity (m/s)} = \text{screw diameter (mm)} \times 3.14 \times \text{screw rotation speed (rpm)}/60/1000 \quad (1).$$

Fifty grams of the pellets thus obtained were weighed and were heated at 550° C. for 3 hours, so that the resin component was removed and the mica contained in the liquid crystalline polyester composition was taken out. The mica thus taken out was observed at the 500-fold magnification with an electron microscope, and the long diameter (d1) and the short diameter (d2) of 500 or more pieces of mica selected at random were measured. As the short diameter (d2) measured was the length of a shortest line segment among line segments passing through the center of the long diameter (d1) in a plane including the long diameter (d1). The volume-average particle diameter was measured with a laser diffraction/scattering particle size analyzer ("LA-300" manufactured by HORIBA, Ltd.) after 100 mg of mica was weighed and was dispersed in water. The ratio (D50/D10) of the 50% cumulative frequency particle diameter (D50) to the 10% cumulative frequency particle diameter (D10) was calculated from a cumulative volume size distribution curve obtained by measurement of the volume-average particle diameter. The weight-average thickness of mica was determined by observing mica at the 1200-fold magnification with an electron microscope and measuring the thickness of 500 or more pieces of mica selected at random. The weight-average thickness is expressed by $(\Sigma ni \cdot Ti^2)/(\Sigma ni \cdot Ti)$. Herein Ti represents the thickness of one piece of mica; and ni was calculated as (number of mica pieces having the thickness Ti)/(total number of mica pieces measured). The weight fraction of the mica having the thickness of not less than 1.0 μm is expressed by $(\Sigma nk \cdot Tk^2)/(\Sigma ni \cdot Ti^2)$. Herein Tk represents the thickness of one piece of mica having the thickness of not less than 1 μm; and nk was calculated as (number of mica pieces having the thickness Tk)/(total number of mica pieces measured).

Example 2

Pellets of a liquid crystalline polyester composition were obtained in the same manner as Example 1, except adjustment of the screw rotation speed to achieve the circumferential velocity of 1.03 mm/s. The ratio d1/d2, the volume-average particle diameter, the ratio D50/D10, the weight-average thickness of the mica and the weight fraction of the mica having the thickness of not less than 1.0 μm contained in the liquid crystalline polyester composition were determined by the same methods as those of Example 1.

Example 3

Pellets of a liquid crystalline polyester composition were obtained in the same manner as Example 1, except adjustment of the screw rotation speed to achieve the circumferential velocity of 0.72 mm/s. The ratio d1/d2, the volume-average particle diameter, the ratio D50/D10, the weight-average thickness of the mica and the weight fraction of the mica having the thickness of not less than 1.0 μm contained in the liquid crystalline polyester composition were determined by the same methods as those of Example 1.

Examples 4, 9 and 10

Pellets of respective liquid crystalline polyester compositions were obtained in the same manner as Example 1, except use of the liquid crystalline polyester (A) shown in Table 1 and adjustment of the screw rotation speed to achieve the circumferential velocity of 1.17 mm/s. The ratio d1/d2, the volume-average particle diameter, the ratio D50/D10, the weight-average thickness of the mica and the weight fraction of the mica having the thickness of not less than 1.0 μm contained in the liquid crystalline polyester composition were determined by the same methods as those of Example 1.

Comparative Example 3

Pellets of a liquid crystalline polyester composition were obtained in the same manner as Example 1, except use of the mica (B) shown in Table 1 and adjustment of the screw rotation speed to achieve the circumferential velocity of 0.33 mm/s. The ratio d1/d2, the volume-average particle diameter, the ratio D50/D10, the weight-average thickness of the mica and the weight fraction of the mica having the thickness of not less than 1.0 μm contained in the liquid crystalline polyester composition were determined by the same methods as those of Example 1.

Comparative Example 4

Pellets of a liquid crystalline polyester composition were obtained in the same manner as Example 1, except adjustment of the screw rotation speed to achieve the circumferential velocity of 1.68 mm/s. The ratio d1/d2, the volume-average particle diameter, the ratio D50/D10, the weight-average thickness of the mica and the weight fraction of the mica having the thickness of not less than 1.0 μm contained in the liquid crystalline polyester composition were determined by the same methods as those of Example 1.

Figure 2:
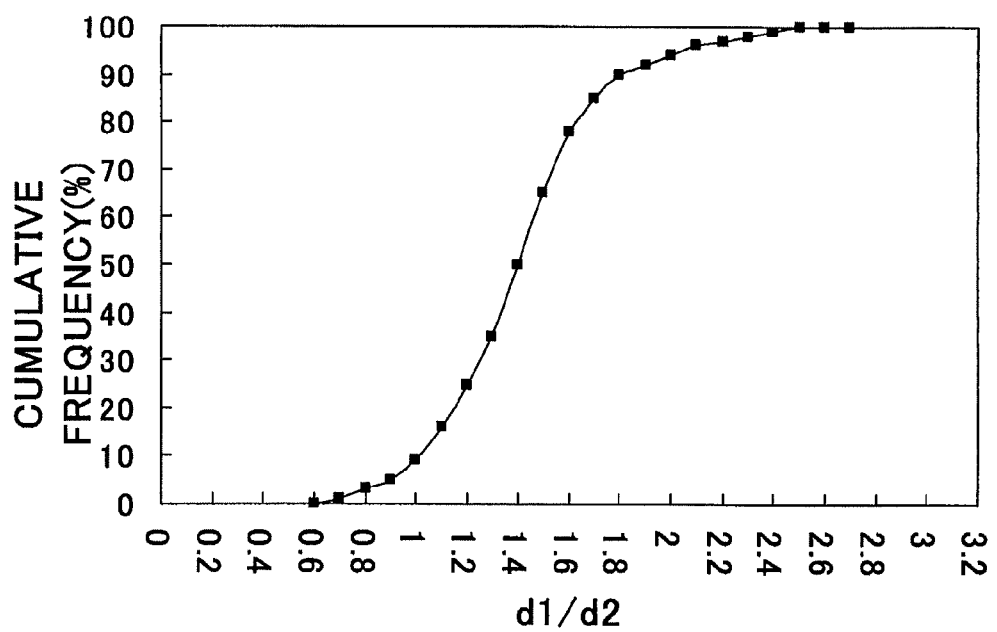
FIG. 2 shows a cumulative frequency distribution of the ratio (d1/d2) of the long diameter (d1) to the short diameter (d2) of mica contained in a liquid crystalline polyester composition produced in Example 1.
Figure 3:
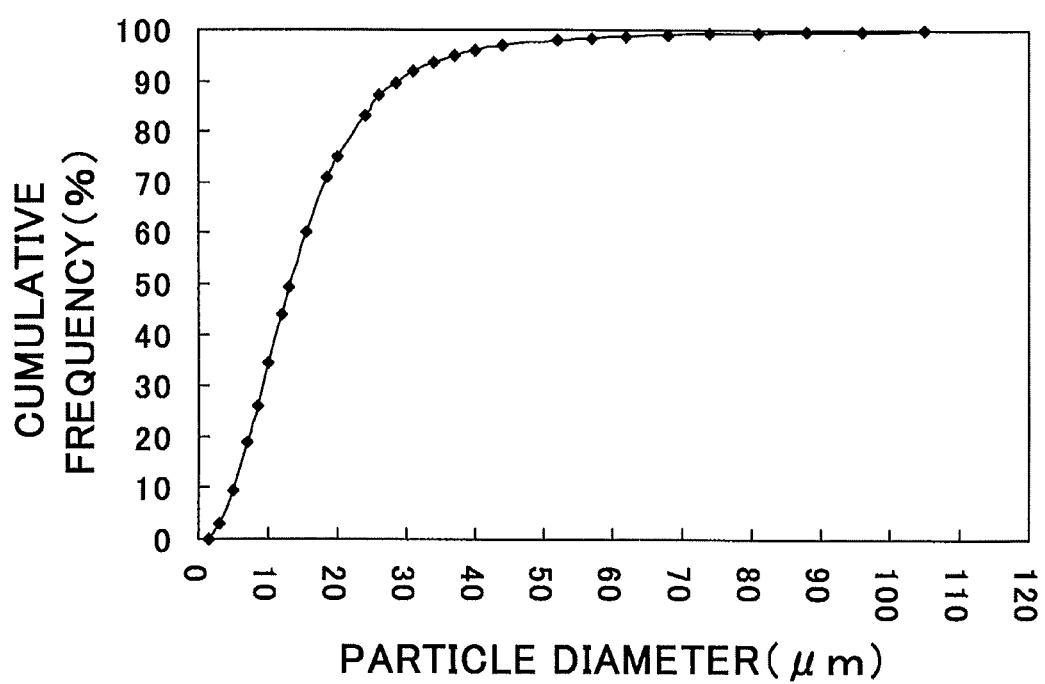
FIG. 3 shows a cumulative volume size distribution of mica contained in the liquid crystalline polyester composition produced in Example 1.

The compositions and the evaluation results of Examples 1 to 10 and Comparative Examples 1 to 4 are shown in Table 1. A cumulative frequency distribution of the ratio (d1/d2) of the long diameter (d1) to the short diameter (d2) of mica contained in the liquid crystalline polyester composition produced in Example 1 is illustrated in FIG. 2, and a cumulative volume size distribution of mica contained in the composition is illustrated in FIG. 3.

TABLE 1

| | (A) Liquid Crystalline Polyester (100 parts by weight) | (B) Mica Content (parts by weight) | | | Circumferential Velocity | Mica in Composition | | | | |
|---|---|---|---|---|---|---|---|---|---|---|
| | | | | | | Ratio of Mica with d1/d2 of not less than 2.0 | Volume-average particle diameter | D50/D10 | Weight-average thickness | Weight fraction of mica with thickness of not less than 1.0 μM |
| | | B-1 | B-2 | B-3 | m/s | % | μm | — | μm | % |
| EX 1 | A-1 | 50 | 0 | 0 | 0.85 | 7 | 18 | 2.52 | 0.38 | 7.8 |
| EX 2 | A-1 | 50 | 0 | 0 | 1.03 | 6 | 14 | 2.58 | 0.31 | 5.8 |
| EX 3 | A-1 | 50 | 0 | 0 | 0.72 | 9 | 24 | 2.73 | 0.48 | 10.5 |
| EX 4 | A-1 | 50 | 0 | 0 | 1.17 | 12 | 11 | 2.33 | 0.18 | 4.2 |
| EX 5 | A-1 | 35 | 0 | 0 | 0.85 | 18 | 22 | 2.71 | 0.78 | 14.3 |
| EX 6 | A-1 | 80 | 0 | 0 | 0.85 | 11 | 14 | 2.19 | 0.27 | 3.8 |
| EX 7 | A-1 | 0 | 50 | 0 | 0.85 | 18 | 28 | 2.61 | 0.85 | 27.6 |
| EX 8 | A-1 | 0 | 0 | 50 | 0.85 | 15 | 37 | 2.16 | 0.28 | 18.5 |
| EX 9 | A-2 | 50 | 0 | 0 | 1.17 | 13 | 15 | 2.28 | 0.72 | 3.4 |
| EX 10 | A-3 | 50 | 0 | 0 | 1.17 | 14 | 12 | 2.22 | 0.19 | 3.1 |
| COMP EX 1 | A-1 | 5 | 0 | 0 | 0.85 | 42 | 34 | 3.33 | 1.15 | 50.8 |
| COMP EX 2 | A-1 | 150 | 0 | 0 | 0.85 | 26 | 13 | 1.85 | 0.19 | 0.7 |
| COMP EX 3 | A-1 | 0 | 0 | 50 | 0.33 | 34 | 51 | 3.12 | 0.81 | 42.1 |
| COMP EX 4 | A-1 | 50 | 0 | 0 | 1.68 | 22 | 4 | 1.75 | 0.11 | 0.5 |

| | Flexural Creep Property Applied load: 20 MPa Loading time: 150 h Test temperature | | Dielectric Breakdown Strength | Thin-Wall Flowability | | | Coefficient of linear expansion | | |
|---|---|---|---|---|---|---|---|---|---|
| | 23° C. GPa | 150° C. GPa | MV/m | Maximum flow length (a) mm | Minimum flow length (b) mm | (a) − (b) mm | MD ppm/° C. | TD ppm/° C. | TD − MD ppm/° C. |
| EX 1 | 14.3 | 7.2 | 69 | 38.2 | 38.1 | 0.1 | 0.3 | 0.4 | 0.1 |
| EX 2 | 13.4 | 6.8 | 67 | 35.5 | 35.3 | 0.2 | 0.4 | 0.6 | 0.2 |

TABLE 1-continued

| | | | | | | | | | |
|---|---|---|---|---|---|---|---|---|---|
| EX 3 | 12.8 | 6.3 | 63 | 31.8 | 31.4 | 0.4 | 0.5 | 0.8 | 0.3 |
| EX 4 | 11.7 | 5.5 | 60 | 28.6 | 27.8 | 0.6 | 0.7 | 1.0 | 0.3 |
| EX 5 | 10.8 | 4.8 | 57 | 39.1 | 38.3 | 0.8 | 0.8 | 1.7 | 0.9 |
| EX 6 | 12.2 | 6.3 | 61 | 25.4 | 24.7 | 0.7 | 0.5 | 1.3 | 0.8 |
| EX 7 | 10.8 | 4.9 | 46 | 27.3 | 26.5 | 0.8 | 0.6 | 1.3 | 0.7 |
| EX 8 | 11.3 | 5.2 | 55 | 24.6 | 23.4 | 1.2 | 0.8 | 1.5 | 0.7 |
| EX 9 | 8.4 | 3.5 | 38 | 29.3 | 27.5 | 1.8 | 1.0 | 2.5 | 1.5 |
| EX 10 | 8.8 | 3.7 | 40 | 22.2 | 20.1 | 2.1 | 0.8 | 2.1 | 1.3 |
| COMP EX 1 | 4.8 | 1.7 | 23 | 41.5 | 30.8 | 10.7 | 1.5 | 4.7 | 3.2 |
| COMP EX 2 | 7.2 | 2.6 | 35 | 11.8 | 5.3 | 6.5 | 0.8 | 4.9 | 4.1 |
| COMP EX 3 | 5.2 | 1.9 | 28 | 19.3 | 14.2 | 5.1 | 1.4 | 3.5 | 2.1 |
| COMP EX 4 | 6.3 | 2.0 | 33 | 16.7 | 12.1 | 4.6 | 1.2 | 3.7 | 2.5 |

As clearly shown in Table 1, compared with the liquid crystalline polyester compositions of Comparative Examples 1 to 4, the liquid crystalline polyester compositions of Examples 1 to 10 had the excellent creep property, the excellent dielectric breakdown strength, the less variation in flowability and the smaller difference in coefficient of linear expansion between the MD and the TD, which indicates reduction of the anisotropy.

The following describes the liquid crystalline polyester compositions of Examples 11 to 15 and Comparative Examples 5 to 7 produced from the liquid crystalline polyester (A), the mica (B) and the inorganic fibrous filler (C) described above.

Examples 11 to 15 and Comparative Example 5

An intermeshed co-rotation-type twin-screw extruder with a screw of 45.8 mm in diameter and with cylinders C1 (main feeder-side heater) to C12 (die-side heater) was used, where an intermediate supply port was placed in the cylinder C6 and a vacuum vent was placed in the cylinder C8. By using a screw arrangement with kneading disks built in the cylinders C3 and C7, the liquid crystalline polyester (A) shown in Table 2, (A-1), was loaded from the main feeder (supply port 1), while the mica (B) and the glass fiber (C) were added from the intermediate supply port (supply port 2). The mixture was melt-kneaded at the cylinder temperature set to the melting point of the liquid crystalline polyester+10° C. and the screw rotation speed adjusted to achieve the circumferential velocity of 0.85 mm/s and was then formed to pellets with a strand cutter.

Fifty grams of the pellets thus obtained were weighed and were heated at 550° C. for 3 hours, so that the resin component was removed and the mica and the glass fibers contained in the liquid crystalline polyester composition were taken out in the state of a mixture. The mixture was dispersed in a mixed solution consisting of 88% by volume of 1,1,2,2-tetrabromoethane (specific gravity: 2.970) and 12% by volume of ethanol (specific gravity: 0.789). After centrifugation of the dispersion at 10000 rpm for 5 minutes, the floating glass fibers were separated by decantation. The glass fibers were then separated from the solvent by filtration. The glass fibers were scattered on a microscope slide such that the respective fibers were not piled one upon another and were subjected to photomicrography at the 800-fold magnification. The fiber lengths of 500 or more fibers selected at random from the photomicrograph were measured, and the number-average fiber length was determined. As for the obtained mica, the ratio d1/d2, the volume-average particle diameter, the ratio D50/D10, the weight-average thickness of the mica and the weight fraction of the mica having the thickness of not less than 1.0 μm contained in the liquid crystalline polyester composition were determined by the same methods as those of Example 1.

Comparative Example 6

Pellets of a liquid crystalline polyester composition were obtained in the same manner as Example 11, except adjustment of the screw rotation speed to achieve the circumferential velocity of 0.33 mm/s. The ratio d1/d2, the volume-average particle diameter, the ratio D50/D10, the weight-average thickness of the mica, the weight fraction of the mica having the thickness of not less than 1.0 μm and the number-average fiber length of the glass fiber contained in the liquid crystalline polyester composition were determined by the same methods as those of Example 11.

Comparative Example 7

Pellets of a liquid crystalline polyester composition were obtained in the same manner as Example 11, except adjustment of the screw rotation speed to achieve the circumferential velocity of 1.68 mm/s. The ratio d1/d2, the volume-average particle diameter, the ratio D50/D10, the weight-average thickness of the mica, the weight fraction of the mica having the thickness of not less than 1.0 μm and the number-average fiber length of the glass fiber contained in the liquid crystalline polyester composition were determined by the same methods as those of Example 11.

The compositions and the evaluation results of Examples 11 to 15 and Comparative Examples 5 to 7 are shown in Table 2.

TABLE 2

| | (A) Liquid Crystalline Polyester (100 parts by weight) | (B) Mica Content (parts by weight) | (C) Glass Fiber (parts by weight) | | Circumferential Velocity | Mica in Composition | | | | |
|---|---|---|---|---|---|---|---|---|---|---|
| | | | | | | Ratio of Mica with d1/d2 of not less than 2.0 | Volume-average particle diameter | D50/D10 | Weight-average thickness | Weight fraction of mica with thickness of not less than 1.0 μm |
| | by weight | B-1 | C-1 | C-2 | m/s | % | μm | — | μm | % |
| EX 11 | A-1 | 35 | 40 | 0 | 0.85 | 7 | 16 | 2.42 | 0.33 | 6.1 |
| EX 12 | A-1 | 35 | 80 | 0 | 0.85 | 8 | 13 | 2.93 | 0.25 | 2.5 |
| EX 13 | A-1 | 35 | 0 | 40 | 0.85 | 16 | 14 | 2.25 | 0.63 | 14.7 |
| EX 14 | A-1 | 35 | 10 | 0 | 0.85 | 9 | 18 | 2.38 | 0.45 | 11.8 |
| EX 15 | A-1 | 35 | 4 | 0 | 0.85 | 18 | 34 | 2.88 | 0.68 | 20.6 |
| COMP EX 5 | A-1 | 5 | 40 | 0 | 0.85 | 35 | 32 | 2.94 | 1.02 | 27.7 |
| COMP EX 6 | A-1 | 35 | 40 | 0 | 0.33 | 26 | 31 | 3.16 | 0.77 | 34.3 |
| COMP EX 7 | A-1 | 35 | 40 | 0 | 1.68 | 23 | 4 | 1.63 | 0.13 | 0.7 |

| | Glass Fiber Number-average fiber length | Flexural Creep Property Applied load: 20 MPa Loading time: 150 h Test temperature | | Dielectric Breakdown Strength | Thin-Wall Flowability | | | Coefficient of linear expansion | | |
|---|---|---|---|---|---|---|---|---|---|---|
| | | 23° C. | 150° C. | | Maximum flow length (a) | Minimum flow length (b) | (a) – (b) | MD | TD | TD – MD |
| | μm | GPa | GPa | MV/m | mm | mm | mm | ppm/° C. | ppm/° C. | ppm/° C. |
| EX 11 | 253 | 16.3 | 9.6 | 71 | 16.8 | 16.4 | 0.4 | 0.1 | 0.6 | 0.5 |
| EX 12 | 188 | 15.4 | 8.1 | 66 | 15.5 | 14.4 | 1.1 | 0.2 | 1.0 | 0.8 |
| EX 13 | 55 | 14.8 | 7.5 | 52 | 17.0 | 14.3 | 2.7 | 0.5 | 1.6 | 1.1 |
| EX 14 | 286 | 15.2 | 8.2 | 88 | 20.2 | 19.4 | 0.8 | 0.3 | 0.9 | 0.6 |
| EX 15 | 464 | 11.5 | 6.8 | 59 | 27.1 | 22.5 | 4.6 | 0.9 | 3.3 | 2.4 |
| COMP EX 5 | 422 | 10.5 | 5.5 | 38 | 12.1 | 6.9 | 5.2 | 0.8 | 5.4 | 4.6 |
| COMP EX 6 | 550 | 8.3 | 5.0 | 25 | 9.3 | 2.3 | 7.0 | 0.6 | 6.3 | 5.7 |
| COMP EX 7 | 97 | 7.7 | 3.2 | 32 | 11.1 | 3.8 | 7.3 | 1.4 | 4.7 | 3.3 |

As clearly shown in Table 2, compared to the liquid crystalline polyester compositions of Comparative Examples 5 to 7, the liquid crystalline polyester compositions of Examples 11 to 15 had the excellent creep property, the excellent dielectric breakdown strength, the little variation in flowability and the small difference in coefficient of linear expansion between the MD direction and the TD direction, which indicates reduction of the anisotropy.

The invention claimed is:

1. A liquid crystalline polyester composition comprising 100 parts by weight of a liquid crystalline polyester (A) and 10 to 100 parts by weight of mica (B), wherein an amount of mica with a ratio (d1/d2) of a long diameter (d1) to a short diameter (d2) that is greater than 2.0, to an entire content of the mica (B) contained in the liquid crystalline polyester composition is not higher than 20%.

2. The liquid crystalline polyester composition according to claim 1, wherein a volume-average particle diameter of the mica (B) contained in the liquid crystalline polyester composition is 5 μm to 50 μm, and a ratio (D50/D10) of a 50% cumulative frequency particle diameter (D50) to a 10% cumulative frequency particle diameter (D10) in a cumulative volume size distribution curve is 2.00 to 3.00.

3. The liquid crystalline polyester composition according to claim 1, wherein a weight-average thickness of the mica (B) contained in the liquid crystalline polyester composition is 0.10 μM to 1.0 μm, and a weight fraction of mica having a thickness of not less than 1.0 μm is 1.0 to 30.0%.

4. The liquid crystalline polyester composition according to claim 2, wherein a weight-average thickness of the mica (B) contained in the liquid crystalline polyester composition is 0.10 μm to 1.0 μm, and a weight fraction of mica having a thickness of not less than 1.0 μm is 1.0 to 30.0%.

5. The liquid crystalline polyester composition according to claim 1, further comprising 10 to 100 parts by weight of an inorganic fibrous filler (C) having a number-average fiber length of 30 to 500 μm.

6. The liquid crystalline polyester composition according to claim 1, wherein the liquid crystalline polyester (A) comprises structural units (I), (II), (III), (IV) and (V), wherein a content of the structural unit (I) is 65 to 80 mol % relative to a total amount of the structural units (I), (II) and (III), a content of the structural unit (II) is 55 to 85 mol % relative to a total amount of the structural units (II) and (III), and a content of the structural unit (IV) is 50 to 95 mol % relative to a total amount of the structural units (IV) and (V)

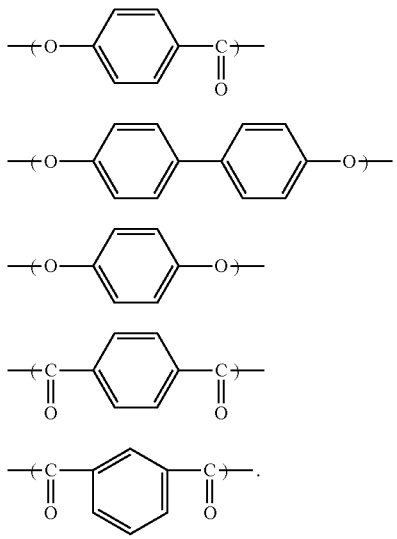

7. A method of manufacturing the liquid crystalline polyester composition according to claim 1, comprising melt-kneading at least a liquid crystalline polyester (A) and a mica (B) supplied to a twin-screw extruder with a screw arrangement that has at least one built-in kneading disk and is set to achieve a circumferential velocity of 0.65 m/s to 1.30 m/s.

8. A molded product manufactured by injection molding the liquid crystalline polyester composition according to claim 1.

9. The molded product according to claim 8, which is a metal composite molded product having a resin part and a metal part joined to the resin part.

10. A liquid crystalline polyester composition comprising 100 parts by weight of a liquid crystalline polyester (A) and 10 to 100 parts by weight of mica (B), wherein an amount of mica with a ratio (d1/d2) of a long diameter (d1) to a short diameter (d2) that is greater than 2.0, to an entire content of the mica (B) contained in the liquid crystalline polyester composition is not higher than 20%, wherein the liquid crystalline polyester (A) comprises structural units (I), (II), (III), (IV) and (V):

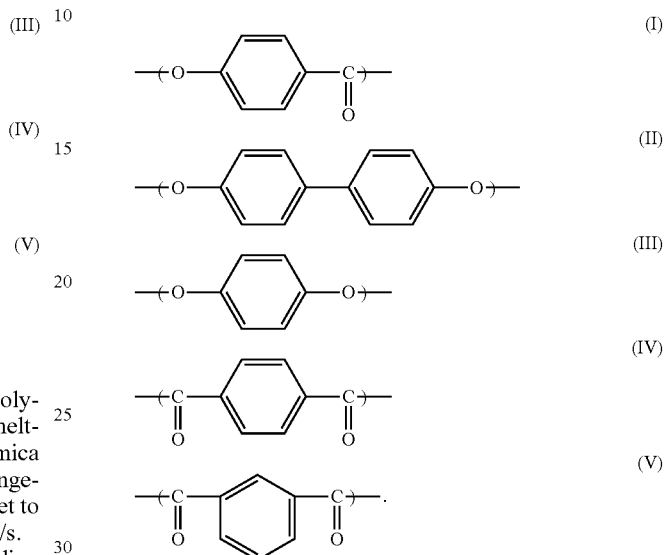

11. The liquid crystalline polyester composition according to claim 1, wherein the mica (B) comprises micas varying in size, and the size includes the long diameter (d1), short diameter (d2) and a thickness.